United States Patent [19]

Schlafly

[11] Patent Number: 4,484,328

[45] Date of Patent: Nov. 20, 1984

[54] TELEVISION LINE MULTIPLEXED DATA COMMUNICATION SYSTEM

[76] Inventor: Hubert J. Schlafly, 27 Orchard Dr., Greenwich, Conn. 06830

[21] Appl. No.: 289,237

[22] Filed: Aug. 3, 1981

[51] Int. Cl.³ .............................................. H04J 3/02
[52] U.S. Cl. ....................................... 370/85; 370/29; 370/99; 358/146
[58] Field of Search ...................... 370/85, 77, 99, 109, 370/29, 100; 358/146, 147

[56] References Cited

U.S. PATENT DOCUMENTS

| | | | |
|---|---|---|---|
| 3,202,764 | 8/1965 | Adams et al. | 370/109 |
| 3,493,674 | 2/1970 | Houghton | 178/5.6 |
| 3,743,767 | 7/1973 | Bitzer | 178/5.6 |
| 3,751,595 | 8/1973 | Moses | 179/15 |
| 3,889,063 | 6/1975 | Slavin | 370/85 |
| 4,052,719 | 10/1977 | Hutt et al. | 340/324 |
| 4,097,692 | 6/1978 | Felix | 370/85 |
| 4,115,662 | 9/1978 | Guinet et al. | 179/15 |
| 4,161,786 | 7/1979 | Hopkins et al. | 364/900 |
| 4,199,656 | 3/1980 | Saylor | 178/66.1 |
| 4,205,343 | 5/1980 | Barrett | 358/147 |
| 4,233,628 | 11/1980 | Ciciora | 358/147 |

OTHER PUBLICATIONS

IEEE Transactions on Consumer Electronics, vol. CE-25, No. 3, Jul. 1979, p. 236.

Primary Examiner—Douglas W. Olms
Attorney, Agent, or Firm—St. Onge, Steward, Johnston & Reens

[57] ABSTRACT

A method and system are described for communicating data from a central station to a plurality of subscribers using conventional television signal format. Individual television scan lines in a television frame are preassigned to convey data to particular subscribers. The preassignment of a television scan line may be, with respect to a portion of a line, one entire line or a multiple of scan lines, depending upon the data requirements of the respective subscribers. For address identification by these subscribers these television scan lines occupy predetermined positions in the television frame. A two-way communication system is provided whereby the subscribers may each return to the central station data transmissions on a different channel or carrier frequency using single or multiple television scan lines. The return transmissions are so timed from the several subscribers that they arrive in a predetermined sequence at the central station in synchronization with the television scan line transmissions from the central station to the subscribers. Conventional television techniques and devices may be used to form a communication system in accordance with the invention.

16 Claims, 5 Drawing Figures

Fig. 5.

TELEVISION LINE MULTIPLEXED DATA COMMUNICATION SYSTEM

FIELD OF THE INVENTION

This invention relates to the communication of data in a form which permits a variety of intermixed data rates while using conventional television synchronizing signal format between a central station and a plurality of users who may be at different distances and locations. More specifically, this invention relates to such data communication system with two-way communication between the central station and each of the plurality of users.

BACKGROUND OF THE INVENTION

Systems and techniques for communicating data from a central station to a plurality of subscribers or users are well known in the art. One technique, known as Teletext, involves the transmission of data during the vertical blanking interval of each television field; see, for example, U.S. Pat. Nos. 4,233,628 to Cicora, 3,493,674 to Houghton, 4,052,719 to Hutt et al and 4,205,343 to Barret. A special issue of the IEEE deals specifically with text display systems such as Teletext and Viewdata. This publication appeared in the IEEE Transactions On Consumer Electronics, dated July 1979, Volume CE-25, Number 3. The Teletext system is particularly adapted to the transmission of the same data to many subscribers who may individually select, store and subsequently display information of interest. The Teletext system may be expanded to fill all available television scan lines with data so that a large amount of data can be transmitted to users. This system, however, does not provide a two-way communication link between the central station and subscribers and is not intended for communicating information at different data rates to different individual subscribers in a large group on a private line or circuit demand basis.

In U.S. Pat. No. 4,199,656 to Sayler, a video signal processor is described wherein data is placed on television scan lines and periodically updated as required. A pseudo video scan line is transmitted to receivers and contains a row of information equivalent to about 11 to 13 actual television scan lines and represents an entire packet of information necessary for video display of the row. Reference is made to a technique for capturing and storing rows of video information for repetetive and continuous display. Other known devices for transmitting data on television scan lines are described in U.S. Pat. Nos. 4,115,662 to Y. M. Guinet et al; 3,743,767 to D. Bitzer et al which distributes data bits designated for individual terminals among the several television scan lines. Although useful, these various data transmission techniques are not as flexible and convenient to apply in a television network wherein data at many different rates needs to be delivered to different subscribers together with return of data from the subscribers to the central station on a real time or other prompt basis.

Techniques have been proposed for enabling two-way communication between a central station and a plurality of subscribers. For example, in U.S. Pat. No. 3,751,595 a time division multiplexed signal having a series of frames and a predetermined number of time slots in each frame is transmitted over a single communications circuit connected to subscriber terminals. Information related to a subscriber is tapped off at the subscriber's terminal such as by counting the number of time slots in each frame until the time slots related to the subscriber is received. The subscriber terminal retransmits the time slots not intended for that terminal and tacks on new information for return transmission. U.S. Pat. No. 4,161,786 describes a return transmission system for a plurality of subscribers connected to a common channel.

SUMMARY OF THE INVENTION

In one system in accordance with the invention for communicating data between a central station and a plurality of subscribers, data is transmitted from the central station to subscribers in television format formed of data modulated television scan lines. The scan lines for the several subscribers are line multiplexed by preassigning a part of one, or one or more television lines to individual subscribers. The number of television lines or portions thereof assigned to an individual subscriber is determined by the through-put data needs for the subscriber as may be expressed in data bits per second. Preferably the assignment involves the dedication of particular line positions or a particular portion of a line in the television frames to individual subscribers. In this manner a communication link such as a television cable channel or a television radio transmission link can be conveniently used to provide a large group of subscribers, which are connected to the cable or otherwise able to receive the transmission from the central station, with data at rates compatible with the subscriber's communication requirements.

For example, by using a data compression technique whereby data is transmitted in bursts at high speed such as employed in the aforementioned Teletext transmission, i.e. about 6.2 megabits per second (mbs) a subscriber can receive data at a standard through-put rate of 9600 bps (bits per second) if a single television scan line per frame is assigned to carry this data to that subscriber. In cases where higher or lower data rates are required by subscribers correspondingly additional television lines or portions of television lines in each frame are assigned to the subscriber to provide the desired through-put data rate.

With the preassignment of television scan lines to individual subscribers, the devices and techniques for composing, transmitting and receiving the television scan lines and television frames may advantageously employ known conventional television technology and available devices such as TV-rf modulators, transmitters, cable repeaters and receivers.

The use of a conventional television scanning format and the conventional vestigial sideband format for radio or cable transmission is a convenience which makes maximum use of existing equipment, circuits and facilities resulting, it is believed, in not only lower cost devices but also benefitting from the widespread familiarity of technicians and operators who have been trained in the television art. The standard television baseband format is not indigenous to the line multiplex technique described here. For example, whereas a conventional NTSC television signal, including vestigial sideband, carrier, video sideband, color carrier and program sound channel, occupies a 6 MHz bandwidth, the line multiplex signal could use a reduced baseband bandwidth by eliminating or modifying certain of these conventional television parameters without changing the basic line multiplex concept described here.

In addition, at each transmitter and receiver terminal in a communication system in accordance with the invention, a data storage buffer or storage register is provided. This enables the conversion of the low speed through-put data rate required by the subscriber to the high speed data rate needed to compress the data in the preassigned television scan lines as part of the combined sync and video television signal. Thus, at a central station data is clocked in to a buffer or storage register at the data clock speed used by the subscriber. This data is accumulated in the buffer until this needs to be inserted as part of the video portion of a television scan line which is preassigned to that subscriber. A high speed clock then clocks out a particular number of bits from the register and these bits are combined with a horizontal sync pulse to form first a television scan line at video baseband and then a carrier modulated signal for transmission to a subscriber. This technique is used for transmitting data to a large number of subscribers with the television scan lines further being part of a television frame containing vertical pulses. Each subscriber is assigned to receive data in one or more particular scan lines.

At the subscribers the television frames vertical pulses are recognized and the scan lines counted until the one preassigned to the subscriber is identified. Data from this scan line as well as others so identified is clocked into a register at the high clock speed and subsequently clocked out at the data clock rate for that subscriber. The high speed clock and data clocks are derived from the incoming television sync signals.

With a communication system in accordance with the invention, a two-way link with connected subscribers can be established preserving the basic television scan line format generated at the central station. Subscribers transmit return signals using one or more or a partial television scan line timing intervals. The return signals employ the same data compression technique to form first a video baseband return signal which, after suitable rf modulation, occupies an interval whose duration is that of a television scan line. The return signals are transmitted back to the central station at such times that the television scan lines from different subscribers arrive at the central station without interference. The return signals arrive in the same time sequence as if the lines originated from a single television signal source, whose horizontal and vertical sync pulses are in synchronization with the same sync signals from the central station.

The return transmission of television scan lines from subscribers may be so controlled that the television scan lines arrive in a predetermined order such as in particular line positions of television frames. This is achieved by employing the television signal format transmitted from the central station to the subscribers as a source of synchronizing signals for the return transmissions from the various subscribers. For example, the return transmission from a subscriber is timed with reference to the arrival at that subscriber of a particular television scan line signal from the central station. The return transmission is delayed, however, for a time period selected to establish arrival of the return transmission at the central station without interference with return transmissions from other subscribers while all subscriber return transmissions arrive at the central station at the repetition rate of the television scan lines generated at the central station.

The return transmissions may be delayed to arrive at the central station in a specific sequence so that each subscriber's returned transmission occupies a particular line position in a television frame, the start of which may be determined from the television frames originally sent to the subscribers.

It is, therefore, an object of the invention to provide a communications system employing conventional television signal format and communication devices. It is a further object of the invention to provide synchronized two-way communication from a central station to a large number of subscribers while using television signal format, both for receiving from and returning data to the central station.

These and other objects and advantages of the invention can be understood from the following detailed description of an illustrative embodiment described in conjunction with the drawings.

DETAILED DESCRIPTION OF DRAWINGS

Figure 1:
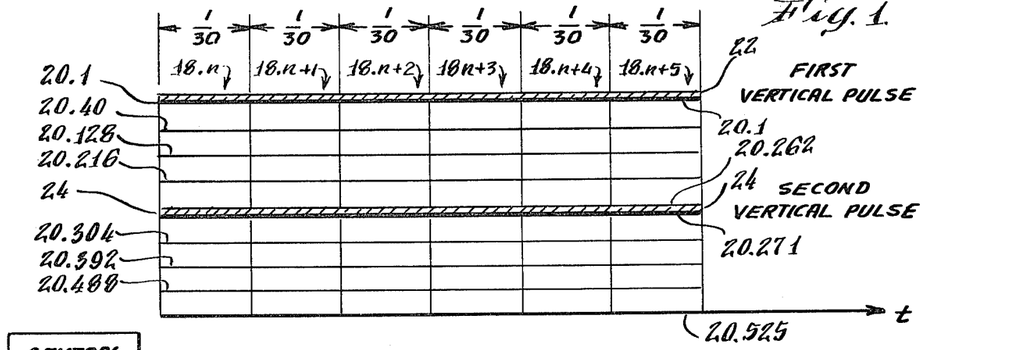
FIG. 1 is a block and timing diagram illustrating a line multiplexing technique in accordance with the invention.

With reference to FIG. 1, a communication system 10 is shown formed of a central station 12 from which a communication link 14 is coupled to remotely located subscriber stations 16.1, 16.2, 16.3 and others. The link 14 may be a direct through the air radio frequency link 14.1 (see FIG. 2) at a suitable frequency by which the subscribers are supplied with information from the central station 12. Such link may employ directional antennas such as 13–13' (see FIG. 2) with a transmitter 15 and receiver 15' in a manner well known in the art. Alternatively, however, the communication link 14 is formed with a coaxial cable 14.2 (see FIG. 2) such as commonly employed with TV cable systems. In each case the link 14 has sufficient bandwidth to establish communication using conventional television format and as further described herein enable two-way communication such as with an additional cable or other known two-way cable techniques whereby subscriber stations 16 can generate return transmissions to central station 12. Link 14 may also be a combination of both radio distribution and coaxial cable and the invention is particularly suited for interconnecting these two transmission methods.

The communication format from central station 12 is composed of conventional sequentially occurring television frames 18 which may be at a rate of thirty per second and each frame is composed of television scan lines in a manner such as prescribed by the NTSC and is commonly employed in TV broadcasting or cable communications in the United States. It should be understood, however, that this invention can be employed with such other television signal format as is employed in foreign countries. The television frames may thus each comprise 525 television scan lines 20, several of which are modified, to form respectively first and second vertical sync pulses 22, 24 which separate the television frames 18 into separate fields 1 and 2, again as is conventional in the art. In the television communication format of FIG. 1, the television scan lines 20 are preassigned to particular subscriber stations 16 as will be further explained.

In order to enable each station 16 to extract the data in a television scan line assigned to that station, the first parts of the frames 18 are, therefore, appropriately coded to identify the start of each frame 18. Such coding may rely upon the fact that the first and second vertical pulses 22, 24 are distinguishable by the respective use of whole line and one-half lines of equalizing pulses. However, another technique for such identification may, for example, include a binary code in the first television scan line, 20.1, following the first vertical sync pulse 22 in each frame 18.

The data for the subscriber stations 16 are line multiplexed by or on the television scan lines so that a group of subscriber stations can be supplied with data from central station 12 during any one television frame with individual scan lines assigned to specific subscribers. The data transmission on any television line is very high, of the order of six million bits per second. At this rate the data is transmitted sufficiently compressed to accommodate different through-put data rates for the subscribers. Since the data rate needs for any one subscriber 16 may vary, the number of television scan lines assigned to a subscriber for a particular data format is correspondingly varied. For example, if subscriber station 16.3 requires a data rate of 9.6 Kbs (kilo bits per second), a single television scan line such as 20.101 can be used in each of the television frames 18 to provide the required data through-put capacity. When a subscriber station such as 16.2 requires a higher data rate, for examples 56 Kbs, additional television scan lines are preassigned for the 56 Kbs message to that subscriber station. In such case, the respective television scan lines are distributed throughout the television frame at generally even time intervals such as shown in the frames 18 at television scan lines 20.40, 20.128, 20.216, 20.304, 20.392 and 20.488. Even higher data rates can be accommodated for any one subscriber station such as 1.544 Mbs for station 16.1 but this then requires a large number of television scan lines of the order of 150, preferably spaced at generally even time intervals or uniformly spaced positions throughout the frames 18.

The transmission of data to the several subscriber stations from the central station 12 may involve transmission of a television signal over a single carrier frequency channel. However, an additional number of channels may be employed depending upon the bandwidth capacity of the communication link 14, the number of subscribers connected to link 14 and their data rate requirements.

At each subscriber station 16, a receiver is employed which extracts a data message preassigned to that station. Thus at subscriber station 16.1 the television scan lines assigned in each frame are received there, then extracted in sequence as shown on line 30.1. Each television scan line 20 is of conventional duration; i.e. about 63 microseconds and commences with a horizontal sync pulse 32 of approximately 4.7 microseconds followed by data over the remaining portion of the line. The subscriber stations 16.2 and 16.3 similarly extract, from the television signal on communication link 14, those respective television scan lines assigned as a data message to the stations and stores these in a register in the received sequence as shown on lines 30.2 and 30.3. The data for each subscriber station 16 need not be transmitted on a continual basis in the respectively assigned television scan line, but may, if desired, be limited to as many frames as are needed to transmit the desired message at the desired rate.

Figure 2:
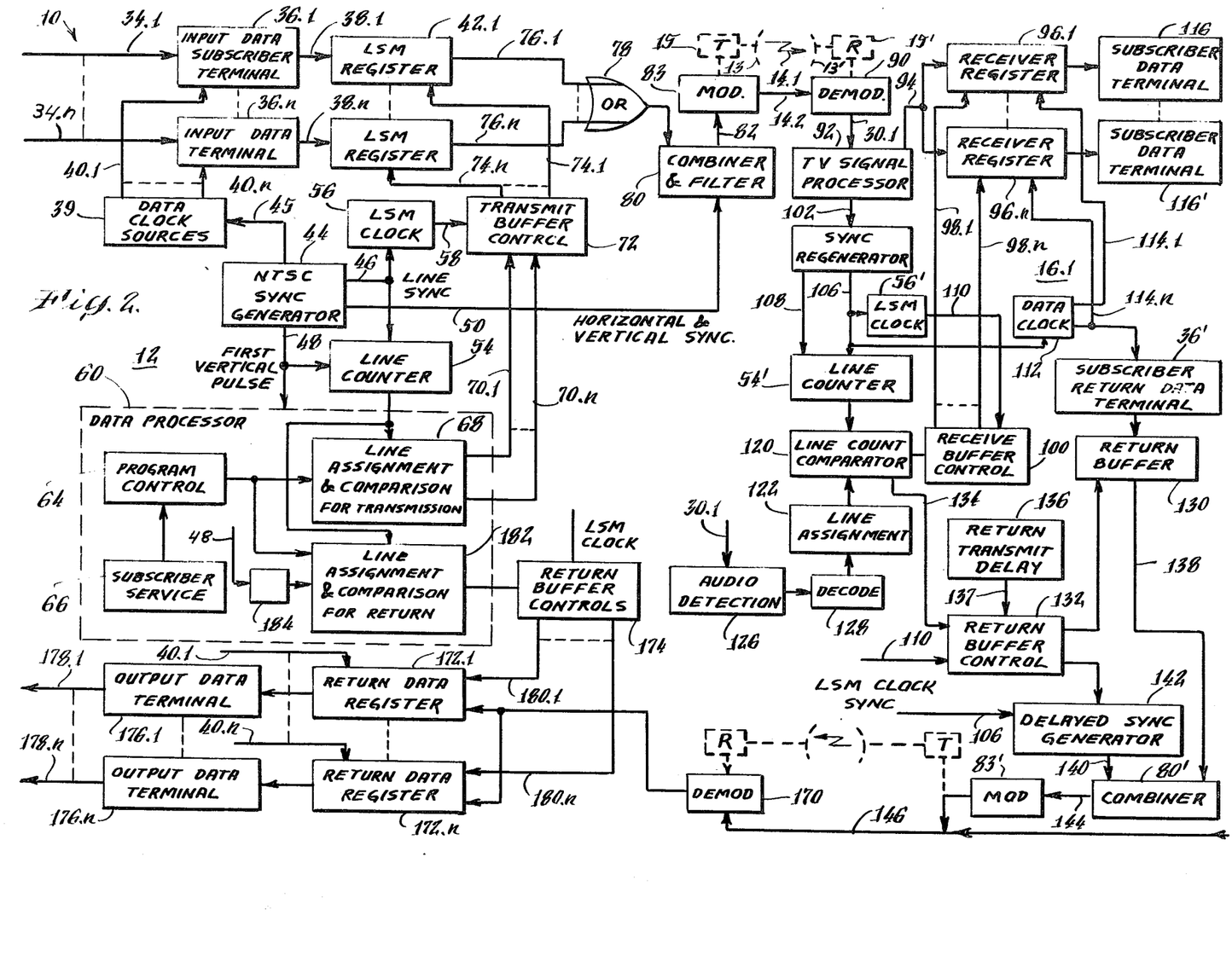
FIG. 2 is a block diagram view of a communication system in accordance with the invention.

FIG. 2 shows the system 10 in greater detail with the central station 12 and one subscriber station 16.1. It is understood that the several subscriber stations coupled to communication link 14 employ similar devices as shown in FIG. 2. System 10 further is so formed to provide a two-way communication link between the central station 12 and subscriber stations 16; although it is understood that if simplex service (one-way) only is required, the basic concepts of the invention equally apply.

The central station 12 gathers data from a plurality of sources presented on input lines 34.1–34.n for transmission to respective subscriber stations. The sources may be derived from external telex lines, telephone lines or other communication lines connected to central station 12. The input lines 34.1–34.n are coupled to appropriate subscriber terminals 36.1–36.n respectively. These terminals are known devices such as modems suitable for receiving data presented on input lines 34.1–34.n and present the data in appropriate format on output lines 38.1–38.n respectively. Since the data arriving on input lines 34.1–34.n may be at different clock rates, the clocking of data from or through terminals 36.1–36.n includes appropriate data clock sources derived from the master data clock of system 10, and thus operate at the same rate as the data presented on input lines 34.1–34.n. The sources 39 provide output data clock signals on lines 40.1–40n which are multiples or submultiples of a master clock frequency such as is indicated in FIG. 2 at line 45, generated by the NTSC Sync Generator 44. By this means the master clock frequency is available for transmission by link 14 to each subscriber station 16 for recovery and use at that station. Input data is advanced through subscriber terminals 36.1–36.n and into buffers or storage registers 42.1–42.n (referred to on the drawing as LSM registers). Data destined for subscribers may thus arrive at different rates on input lines 34.1–34.n for transmission along a common television communication link 14 to subscribers 16.

An NTSC sync generator 44 is provided to supply horizontal and vertical sync pulses for a television transmission in a manner well known in the art and supplies the horizontal sync pulses 32 (see FIG. 1) on an output line 46. Pulses representative of the first vertical pulses 22 (see FIG. 1) are presented on an output line 48 and a composite sync signal of horizontal sync pulses 32 and vertical sync pulses 22, 24 is supplied on an output line 50. The first vertical pulses 22 on line 48 are coupled to a reset input of a line counter 54 while the horizontal sync pulses on line 46 are coupled to the counting input of line counter 54 and a high speed line (LSM) clock 56.

The LSM clock 56 is synchronized with a particular high multiple (about 400) of the horizontal sync pulses 32 on line 46 so as to generate on its output line 58 a clock rate selected as particularly useful for compressing the data in registers 42.1–42.n in respective television scan lines.

The central station 12 also incorporates a data processor 60 which may be a programmable microprocessor having a memory 62 (see FIG. 3) and is provided with suitable instructions to form a program control 64, a subscriber service management section 66 and the specific assignments as hereinafter described for transmission of data to subscribers 16 and managing their return transmissions.

The subscriber service management section 66 includes appropriate updated and changeable information as to which subscribers are to receive data and at what data rates so as to generate appropriate line assignment instructions. These instructions are represented in the described system as particular scan line numbers or scan line positions relative to the first vertical pulses 22 in the television frames 18 for any one subscriber 16, both for transmission to and reception from the subscriber 16.

The program control 64 supplies the line count instructions to a program section 68 with which the count developed by line counter 54 is compared and appropriate instructions are generated on a multiple of output lines 70.1–70.n to a transmit buffer control 72. These instructions, which may be in the form of separate enabling signals to AND gates in buffer control 72 cause the coupling of the high speed LSM clock 56 to one of the LSM registers 42.1–42.n allowing the selected register's data accumulated from an input line 34 to be clocked out at high speed for insertion in the video baseband portion of a television scan line.

Hence, at the appropriate time, as determined by a signal on line 70 from data processor 60, and following identification of the start of the television scan line in which data from a terminal 36 is to be sent to a subscriber station 16, the pulses from high speed LSM clock 56 are permitted to pass through buffer control 72 onto one of its output lines 74. The high speed clock pulses clock out the accumulated data in an LSM register 42 onto its output line 76 through an appropriate OR gate 78 to a combiner circuit 80 in which a complete television scan line at video baseband frequencies is formed and provided on output line 82.

Combiner circuit 80 combines the composite sync signal on line 50 from sync generator 52 as well as the high speed data from OR gate 78 into a conventional video baseband format. This results in the formation of television frames 18 (see FIG. 1) with each frame containing 525 television scan lines or such other number as is customary for the television communication link 14. The frames 18 occur at intervals of 1/30 of a second or such other rate as may be conventional for television communication and are individually recognizable either by identifiable first vertical sync pulses 22 or by a special code in the first scan line at the start of each frame.

The video baseband signal on line 82 is applied to a modulator 83 for rf transmission to subscriber stations 16 along a suitable communication link formed with an antenna system, 14.1, or coaxial TV cable 14.2.

The technique for inserting subscriber terminal data into television scan lines 20 may vary from that which is shown. For example, the function performed by line counter 54 can be achieved within data processor 60. The use of an external line counter may be expanded when a line identification code is inserted in a television scan line so that each subscriber station 16 upon detection of the code can extract data from the portion of a television scan line assigned to that subscriber. In addition, a particular television scan line may be shared between more than one subscriber. In such case instructions to that effect are entered into the subscriber service section 66 and when the count of the scan line to be shared is recognized, a corresponding number of enabling output signals on appropriate lines 70 are generated during that scan line to enable data from different subscribers LSM registers 42 to be clocked out to combiner circuit 80 and become a part of that scan line. In such case, synchronization between the enabling signals on lines 70 and the high speed LSM clock is needed to assure proper sharing of that scan line.

The amount of data that can be inserted in any one television scan line is a function of the available bandwidth and thus the rate of the line clock 56 has a practical high limit. However, a sufficiently high clock speed may be used to compress a substantial amount of data in any one television scan line. For example, a clock rate of the order of about 6.3 MHz may be used for clock 56 so that the effective through-put data rate for one television scan line per frame can be at least equal to a line source data rate of 9600 bps, one of several standard data transmission rates.

When a higher through-put data rate is required by a subscriber station, more than one television scan line is preassigned to that station. In such case, however, the television scan lines are preferably distributed at generally equal time intervals throughout a television frame 18 to reduce buffer storage needs both at the central station 12 and the subscriber stations 16. This is illustrated in the partial view of FIG. 3 wherein the memory 62 contains data insertion instructions at six different memory locations 84.1–84.6 related to a common subscriber station 16.2.

Figure 3:
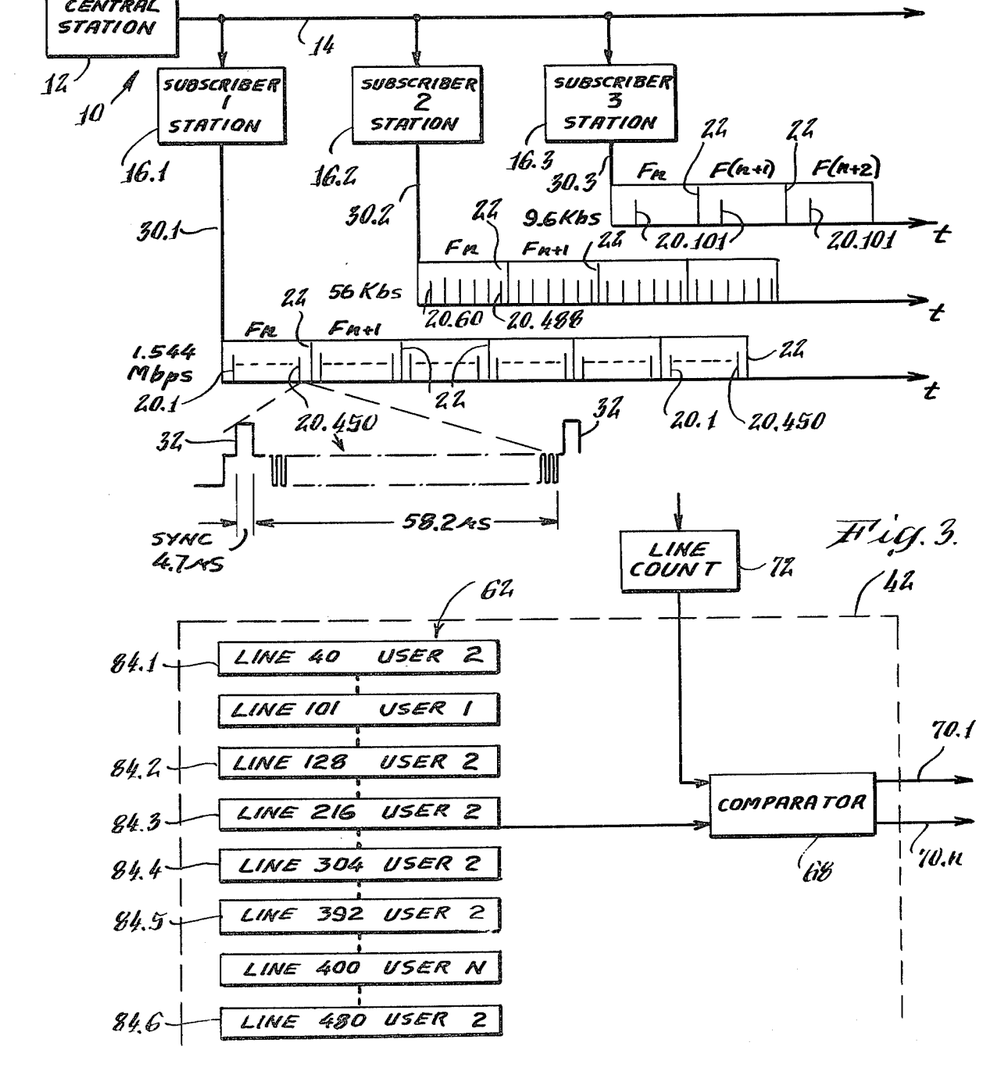
FIG. 3 is a partial schematic view of a signal processor used to organize and accommodate the different data rate needs for various subscribers coupled to the communication system of FIG. 2.

The memory locations 84.1–84.6 correspond to television scan line positions or counts, as measured relative to the vertical frame pulses 22, of 40, 128, 216, 304, 392, 480. Each of the latter memory locations include instructions according to which data from the same data source 34.1–34.n (see FIG. 2) is inserted in a television scan line. The resultant through-put data rate for six television scan lines is sufficient for a standard 56 Kbs data format. Because of the generally uniform distribution of these television scan lines throughout a television frame 18, data register storage needs are minimized.

The number of television scan lines 20 that are needed to provide a subscriber with its required data needs depends upon the pulse rate of the high speed LSM clock 56. Its speed can be so selected that the number of data bits inserted in any one scan line equals or slightly exceeds an exact sub-multiple of the subscriber's data rate. For example, the LSM clock speed may be such that a scan line will contain 320 data bits, which then precisely matches one standard 9600 bit rate for a frame rate of thirty per second. However, in such case a similar precise matching with other standard data rates such as 56 Kbs is not achieved and it becomes necessary to assign a number of scan lines 20 whose capacity at 320 bits per line exceeds the required throughput data rate. The excess capacity may then be filled (or stuffed) with data bits destined for another subscriber or merely filled by prearrangement with data of a particular character.

At the subscriber stations, such as 16.1 shown in FIG. 2, the television signal is demodulated in a demodulator 90 which reproduces at output line 30.1 the video baseband signal and this includes the data as inserted at the high speed clock rate of clock 54 at the central station 12. The demodulated baseband signal is delivered to a TV signal processor 92 which delivers scan lines on line 94 to one or more receiver data registers 96.1, 96.2. The latter preferably are of the FiFo type, i.e. a first-in-first-out memory so that data can be stored simultaneously with data being extracted. The registers 96.1, 96.2 accumulate the television scan line data provided an appropriate clocking signal is present on a line 98.1 or 98.n from a buffer control 100. Such clocking signal on a line 98 is present when message data on a television scan line assigned to subscriber station 16.1 is being demodulated. The television signal processor 92 also extracts a complete sync signal for output on line 102.

The extracted composite sync signal on line 102 is applied to a circuit 104 from which horizontal sync pulses are regenerated on line 106 and a pulse representative of the first vertical pulse 22 in the received video frames is generated on output line 108. The vertical pulses on line 108 are applied to the reset input of a line counter 54', similar to the counter used at the central station 12. The horizontal sync pulses on line 106 are applied to high speed data clock 56' to regenerate on output 110 the high speed LSM clock rate of the incoming data on line 30.1. The horizontal sync pulses on line 106 are also applied to line counter 54' which counts them so that a count is accumulated with reference to the first vertical pulses 22.

The sync generator pulses 106 are also applied to a clock network 112 which generates clock pulses on output lines 114.1–114.n at a rate which corresponds to the data rate on an input line 34 to central station 12. For example, the data clock 112 derived by forming a multiple or submultiple of the horizontal sync pulses on line 106 may be applied to network 112 to generate the data clock on output line 114. The output of data clock 112 is applied to the receiver register 96.1, and others if they are employed, so as to provide a continuous flow of output data to subscriber terminals 116, 116' at precisely the same data rate as present on the subscriber's input line 38 at the central station 12.

The line counter 54' counts each of the horizontal sync pulses 32 on line 106 and which precedes the data portion of a television scan line. A line count comparator 120 compares the count in line counter 54' with preassigned line counts stored in a line assignment network 122. When a positive comparison is made, the comparator 120 produces an enable signal to buffer control 100 to select the proper storage register 96 by controlling activation of a line 98.

Many of these described logic functions can be performed with a programmable data processor located at the subscriber station 16 with the particular embodiment being presented to illustrate the invention. One particular advantage of the subscriber station 16 is that the line assignment information stored as a line count in network 22 can be altered by remote control from the central station. Such change in line count may be necessary, for example, when no data is to be sent to that subscriber or when the data rate to the subscriber is changed. One technique for changing line assignment information may be by transmitting appropriately coded instructions on a separate telephone link or on a separate audio frequency within the frequency band of the television signal being sent on link 14.

Thus, the demodulated video signal on line 30.1 may be also applied to an audio detector 126 which reproduces the audio code sent from the central station 12. A decode network 128 recognizes a suitable identification code when the audio code is to be received by the subscriber station 16.1 and stores the decoded audio instruction following the identification code as new line assignment instructions in network 122.

The frequency of the LSM clock 56' may be controlled with a phase-lock loop and locked onto a sample frequency burst on the so-called backporch portion of the horizontal sync pulse 32 in a similar manner as currently employed for a color carrier in conventional television signals. The high speed clock 56 used to compress incoming data onto television scan lines may be selected with a particular high frequency which is a specific multiple of the horizontal line frequency. Transmission of clock information with the data signal facilitates regeneration of the clock at subscriber stations 16 and enables use of the same high speed LSM clock in the various communications between the central station and subscribers.

A particular advantage of communication system 10 is its capability of two-way communication by which data can be returned from the subscribers 16 over a common channel 140 to the central station 12. At each subscriber station, a return data terminal 36' is provided similar to the subscriber terminal 36 at central station 12. The return data is applied to a return register 130 which is similar to the register 42 described with reference to the central station 12 except that only specifically authorized television scan lines are transmitted back to central station 12.

Thus data from subscriber terminal 36' is accumulated in buffer register 130 at the same clock rate as supplied by data clock 112 and thus the same as for the incoming data message. An authorization for transmission of a particular line is received at a return buffer control 132 by a signal on line 134 from the line count comparator 120 in response to a preprogrammed line assignment instruction applicable to a return transmission. A transmit delay signal, whose purpose is described below is generated by a delay network 136 and is also supplied to transmit buffer control 132. The latter control enables high speed clock pulses on line 110 from the high speed LSM clock 56' to clock out the data from buffer 130 onto line 138 connected to a combiner circuit 80'. The latter combines the horizontal synchronizing pulse on line 106 through a delayed sync generator 142 with the return data on line 138 to provide a video baseband signal on line 144 to a modulator 83'.

The horizontal sync pulse on line 140 and clocked out data on line 138 are combined by network 80' to form a video base band signal having a duration of a single television scan line. This single scan line of a baseband television signal on line 144 is applied to modulator 83' for rf transmission along a return channel 146 back to central station 12. The return channel 146 may be a coaxial cable or a radio link whichever is chosen for this distribution service. The return transmissions from the various subscribers are so timed, by use of the return delay networks 136, that the return signals arrive at the central station delayed in phase but in synchronization with the transmissions of television scan lines from the central station 10 to the subscribers 16.

At the central station 12 the single rf modulated scan lines are demodulated with demodulator 170 and the returned data entered into return data registers 172 under control by a buffer control 174 and signal processor 60. The returned data is then clocked out of registers 172 with data clock signals on lines 40.1–40.n and applied to output data terminals 176.1–176.n respectively assigned to subscribers 16 for transmission of data onto outgoing communication lines 178.1–178.n of a type similar to input communication lines 34.1–34.n.

Since the return transmissions on channel 146 arrive in synchronization with the transmissions on link 14 to the subscribers 16, the central station 12 has sufficient information to determine where data in an arriving return scan line should be stored and thence send onto an output terminal 176. Commencing with the first vertical pulse 22 in a television frame being sent from the central station 12, the subsequent arrival time of the first return scan line on channel 146 is accurately known from information of the round trip distance to the subcriber 16 which originated this first scan line. Hence, following an initial time delay equal to this round trip travel time and after the first vertical pulse 22, the first return scan line is demodulated and the data subsequent to its horizontal sync stored in the proper return data register 172.1. Subsequent data from returned scan lines are stored in data registers 172 as they arrive at central station 12.

The identification of returned television scan lines may employ a line counter and line assignment technique as previously described with reference to the central station 12 and subscriber stations 16. Furthermore, the clocking of data from returned television scan lines may employ the LSM high speed clock signal on line 58 but then appropriately synchronized with the clock synchronizing signal as presented on the back porch of horizontal sync pulses included with the returned television scan line signal in channel 146.

The buffer control 174 provides control signals on lines 180 to data registers 172 to direct storage of the returned data from subscribers 16. The buffer control in turn receives appropriate instructional information from signal processor 60, through a line assignment and comparison section 182. This includes a return delay signal generator 184 representative of the arrival time of the first returned scan line on channel 146 following the generation of the first vertical pulse of a television frame on line 48. The first returned scan line may thus be identified so that the count of subsequently arriving scan lines relative to the first vertical pulse can be used to identify and properly store data in these return signals.

It is particularly important that the return transmissions from the several subscribers arrive at central station 12 without interference from each other and preferably in a manner whereby conventional television circuitry and devices can be used to extract and identify the return data. Thus, with reference to FIGS. 4 and 5, the two-way communication system 10 can be more clearly understood. The central station 12 generates as described on an X frequency channel 190, the television signal frames 18 as shown and described in FIG. 1. However, in FIGS. 4 and 5, reference is had only to a single television frame though it should be understood that the following description is intended for illustration only and also applies to continuous transmission of television frames.

Figure 4:
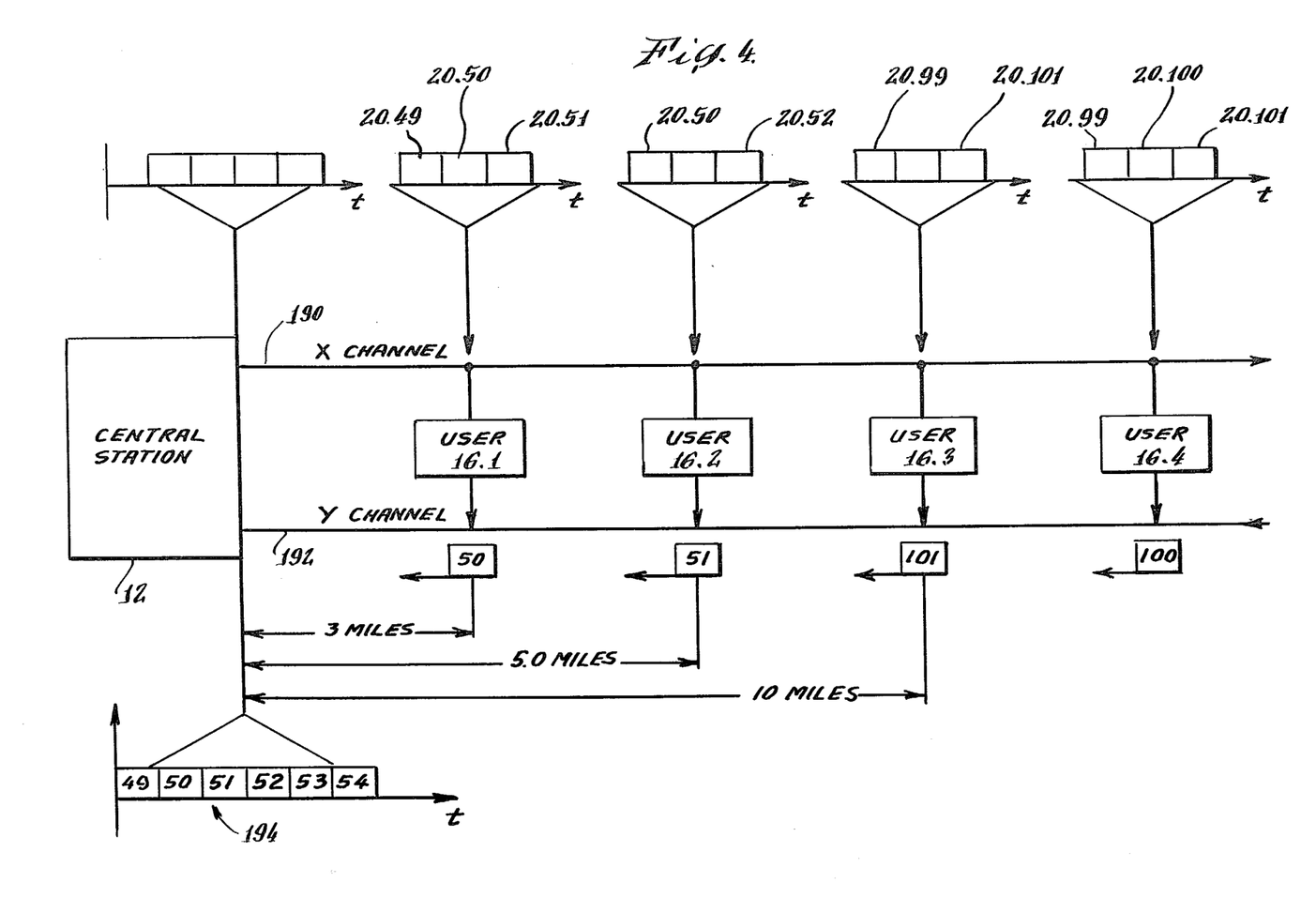
FIG. 4 is a block diagram view of a two-way communication system in accordance with the invention.

FIG. 4 shows television scan lines 20.49, 20.50 and 20.51 of a frame being sent to the various subscribers 16.1, 16.2, 16.3 and 16.4 who are each successively farther spaced from central station 12 as shown. Each subscriber is preassigned to receive a particular line, whose precise position in the frame does not matter, except that for this illustration it is at an earlier position in a frame than the return transmission from the subscriber on a return channel Y, 192. In the example of FIG. 4 subscriber 16.1 returns data following the horizontal sync pulse of the fiftieth scan line in the television frame on the channel x. This enables a return which could start some time during the fiftieth scan line in the transmission to the central station. Similarly, subscriber 16.2 is assigned to return data in scan line 20.51, subscriber 16.3 in scan line 20.101 and subscriber 16.4 in scan line 20.100. Note that the latter scan line occurs earlier than scan line 20.101 even though subscriber 16.4 is farther away from central station 12 than subscriber 16.3 who uses scan line 20.101. The return transmissions may, therefore, be placed by the subscriber stations in any specified scan line. This is done by selecting the horizontal sync signal on the x channel and adding such suitable time delay 136 (see FIG. 2) whose effect can be more clearly understood from FIG. 4 at 194 and from FIG. 5.

The delay 136 (See FIG. 2) in each of the return data generating networks at the various subscribers 16, are so selected that the returned television scan line signals from all subscriber stations arrive at central station 12 as if the signals originated from a single television signal source. This is illustrated in FIG. 4 at 194 where the arriving television scan line signals 20.49–20.54 are illustrated in close time sequence. Delays 136 are thus so selected as to cause at central station 12 a sequence of returned television scan lines identical in timed relationship to the normal television horizontal line rate originally generated at that central station.

Figure 5:
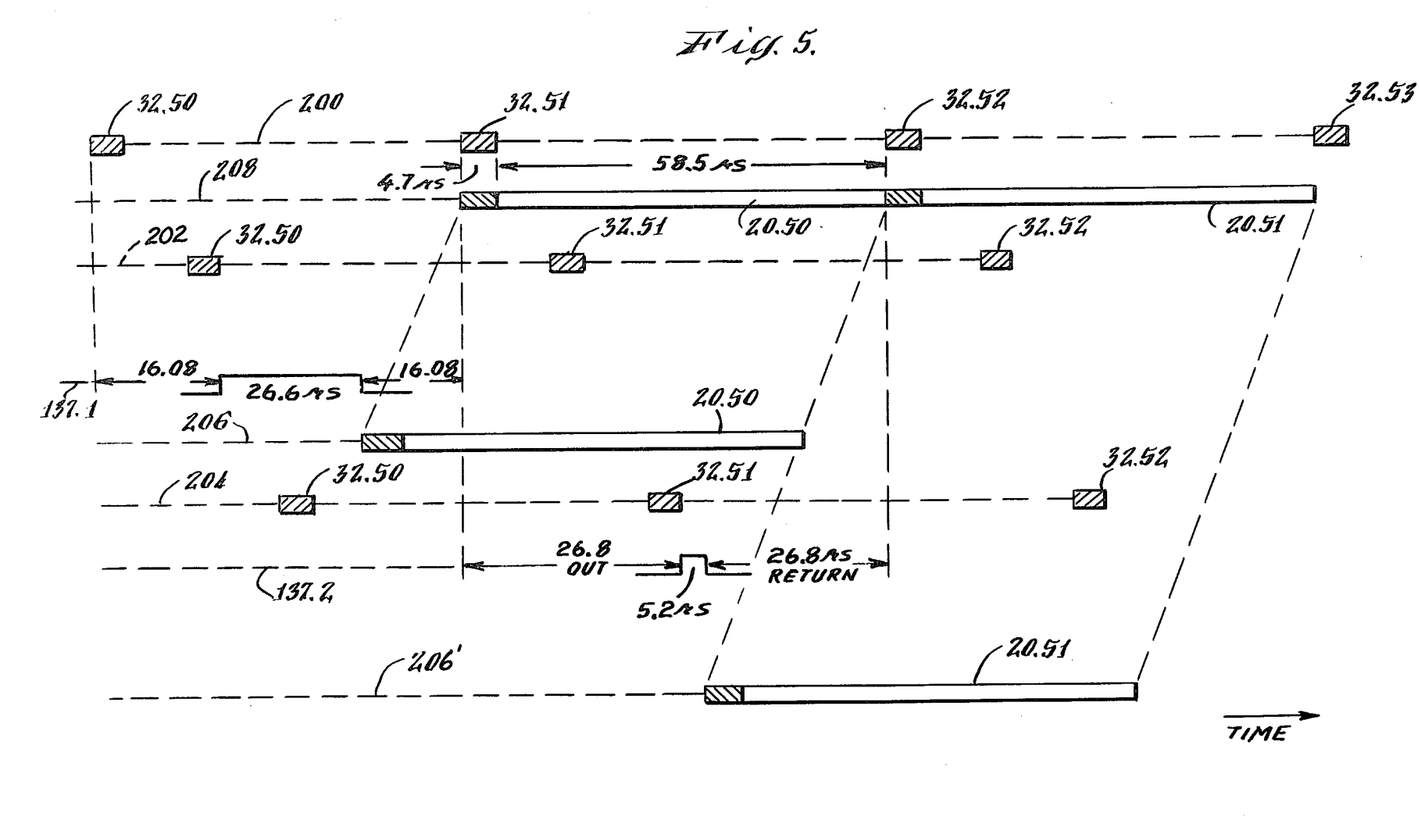
FIG. 5 is a timing diagram for a two-way communication system in accordance with the invention.

FIG. 5 illustrates on a time scale, different signals as they originate or arrive at different locations. Thus, at 200 the occurrence of the horizontal sync pulses 32.50, 51, 52 and 53 are shown as generated at the central station 12 and at 202 the time of arrival of these sync pulses at subscriber 16.1, and at 204 the arrival of the sync pulses at farther spaced subscriber 16.2. This delay arises from the finite velocity of electromagnetic waves through any transmission medium. A return transmission from subscriber 16.1 is delayed further as shown at 137.1 by the delay network 136 at that subscriber terminal for 26.6 microseconds (allowing 4.7 microseconds for detection of the arriving horizontal sync pulse 32) at which time, as shown at 206 a return transmission of a single television scan line is begun from subscriber 16.1. This latter return arrives back at central station 12 as shown at 208 just as the horizontal sync pulse 32.51 is produced at the central station. The time of arrival of the beginning of the return transmissions from subscriber 16.1 is thus exactly equal to one television scan line as measured relative to the sync pulse 32.50 used to initiate this return at the subscriber. This time is made up of 32.16 microseconds for round trip travel time and 26.6 microseconds of delay and 4.7 microseconds for recognition of the horizontal sync pulse. Since the return transmission preferably includes the horizontal sync pulse, the delay at subscriber terminal 16 is selected so that the sync pulse in the return scan lines arrive during the interval when the sync pulses 32 are generated from control station 12.

Similarly, the return transmission from subscriber 16.2 is initiated by sync pulse 32.51 and then as shown on line 137.2 delayed by a short delay, but sufficient to assure arrival at central station 12 just as sync pulse 32.52 is generated. In this manner all return transmissions can be selected to occur in television line sequence at the central station 12.

It can be seen from FIG. 5 that the return delay can be increased to select the arrival of the return transmission during any desired television scan line interval yet without interference with the transmissions from other subscribers while maintaining the television horizontal line rate. For example, the next subscriber, if he were to transmit a return which is to arrive during the fiftysecond scan line, yet is too far away from the central station 12 to initiate a return transmission using sync pulse 32.52, can initiate a return in response to an earlier sync pulse such as 32.49, while adjusting the subscriber return delay accordingly to assure correctly timed arrival.

Having thus described a data communication system for a plurality of subscribers, the advantages of the invention can be appreciated. The embodiments described herein are for illustration only with variations therefrom being possible without departing from the scope of the invention. For example, the clock rate used to compress data onto television scan lines may be selected so as to fill a television scan line with a predetermined number of data bits. The clock rate and message elements in a single or selected number of television scan lines can be selected to exactly equal the message element rate for a subscriber. The television scan lines may be provided with run-in high speed data pulses at the start of the line for such synchronization and proper pulse detection. Guard bands may be used to provide desired time separation between returned television scan lines. In some cases another synchronization signal can be sent on an audio carrier in the same television rf channel.

I claim:

1. A system for communicating data between a central station and subscribers located at different distances from the central station with the data transmitted from the central station to the subscribers being in a television format composed of sequentially occurring television frames wherein the frames consist of television scan lines formed of the data comprising:
    means for generating, as part of television frames, television scan lines composed of data with all of the data of part of a line or of an entire individual television scan line being preassigned to a respective individual subscriber, the through-put data rate for a subscriber being determined by the portion of a line or number of lines being preassigned to the subscriber;
    means coupled to said generating means for identifying individual television scan lines so as to enable the generation of said television lines with data destined for respective subscribers;
    means for transmitting said television frames to the subscribers; and
    means located at the subscribers for detecting those television scan lines in the frames assigned to respective subscribers, and means at each subscriber for extracting data from the detected television scan line that is preassigned to the subscriber.

2. The system as claimed in claim 1 wherein said means for enabling the identification of television scan lines includes:
    means for counting the television scan lines in the television frames relative vertical sync pulses in the television frames; and
    means responsive to said television scan line counts for placing data designated for individual subscribers in television scan lines whose frame line positions bear predetermined counts relative to said vertical sync pulses.

3. The system as claimed in claim 1 wherein said means for generating television scan lines further includes:
    means for establishing a desired through-put data rate for an individual subscriber by assigning a plurality of television scan lines in a frame to said subscriber so that all the data in said latter lines establish said through-put rate.

4. The system as claimed in claim 3 wherein said means for establishing said through-put data rate in a plurality of television scan lines includes means for uniformly distributing said lines assigned to a respective subscriber throughout the television frame.

5. The system as claimed in claims 1, 3 or 4 wherein said means for enabling identification of television scan lines includes:
    means for counting the television scan lines in the frames relative to vertical sync pulses employed with said frames;
    means for storing subscribers' identification signals in the form of television scan line counts and
    means responsive to the stored subscribers' identification signals and the count of television scan lines of the frames being generated for placing data designated for individual subscribers in those television scan lines for which the counts correspond to the subscribers' identification signals.

6. The system as claimed in claims 1, 2, 3 or 4 wherein said generating means further includes means for compressing data into said television scan lines at a rate selected to provide a predetermined through-put data rate for the subscribers to whom the television scan lines are preassigned.

7. A system for communicating data between a central station and a plurality of subscribers located at different distances from the central station wherein data being transmitted from the central station to the subscribers is in a first signal channel and in television format composed of sequentially occurring television frames consisting of television scan lines formed of data comprising:
    means for forming television scan lines consisting of data wherein the television lines are individually preassigned to subscribers so that the subscribers receive data on a television scan line multiplexed basis;
    means for transmitting the television scan lines as part of television frames to the subscribers in said first signal channel;
    means at the subscribers' locations for detecting the television lines preassigned to respective subscribers, and means for extracting data in the detected television lines;
    means at the subscribers' locations for generating television scan line signals formed of data for return transmission to the central station in a second signal channel, said television scan line signals being generated at respective subscribers in synchronization with predetermined television lines in the television frames in said first signal channel; and
    means at said subscribers' locations for delaying return transmission of said television scan line signals originating at the subscribers for time periods selected to establish arrival of the television scan line signals at said central station in synchronization with the television scan lines in the first signal channel as generated at the central station.

8. The system as claimed in claim 7 and further including:
    means at said subscribers for detecting a predetermined television scan line in the transmission from said central station and initiate said return transmission.

9. The system as claimed in claim 8 wherein said means detecting said predetermined television scan line comprises means for detecting the horizontal sync pulses in the television scan lines being transmitted from said central station.

10. The system as claimed in claim 8 wherein said means for detecting a predetermined television scan line includes:
means for counting the television scan lines in a television frame; and
means for initiating said return transmission when said counting means has counted arrival at said subscriber of a predetermined number of television scan lines in the television frame.

11. The system as claimed in claim 7 and further including:
means at said central station for counting the return transmissions of television scan line signals for identification of the subscriber source thereof.

12. The system as claimed in claim 7 and further including:
means at the central station for counting the television scan lines being generated at the central station for identification of the subscribers from whom the return television scan line signals originate.

13. The system as claimed in claim 12 wherein said counting means comprises:
means for generating pulses representative of horizontal sync pulses in the television scan lines being transmitted from said central station with said latter pulses being counted for said identification.

14. A method for communicating data between a central station and a plurality of subscribers at locations having different distances from the central station wherein the data is transmitted from the central station to the subscribers in a signal channel and in television format composed of television lines formed by the data with the television lines arranged in television frames comprising the steps of:

forming television lines with data, with individual television lines being respectively dedicated for the use by individually designated subscribers;
transmitting the television lines in television frame format in said signal channel to the subscribers;
detecting at the subscriber locations those television scan lines which are dedicated to respective subscribers so as to provide the subscribers with the data therein; and
extracting at the subscriber locations the data from the detected television lines.

15. A method for communicating data between a central station and a plurality of subscribers at locations having different distances from the central station wherein data is transmitted from the central station to the subscribers in a first signal channel and in television format composed of television lines formed by the data with the television lines arranged in television frames comprising the steps of:

forming television lines with data, with individual television lines being respectively assigned for the use by individually designated subscribers;
transmitting the television lines in television frame format in said first signal channel to the subscribers;
detecting at the subscriber station those television lines which are assigned to the respective subscribers so as to provide the subscribers with data in said television lines;
extracting at the subscribers' locations the data from the detected television lines;
forming at the subscribers return television lines formed of data for return transmission to the central station at times selected to establish the arrival of returned television lines from subscribers at the central station in synchronization with the television lines generated at the central station for transmission to the subscribers in the first signal channel.

16. The method of claim 15 and further comprising:
initiating return transmissions from the subscribers with respect to arrival there of predetermined television lines.

* * * * *